(12) United States Patent
Wade

(10) Patent No.: US 7,764,223 B2
(45) Date of Patent: Jul. 27, 2010

(54) RADAR APPARATUS

(75) Inventor: Barry Wade, Essex (GB)

(73) Assignee: Kelvin Hughes Limited, Essex (GB)

( * ) Notice: Subject to any disclaimer, the term of this patent is extended or adjusted under 35 U.S.C. 154(b) by 0 days.

(21) Appl. No.: 11/795,072

(22) PCT Filed: Jan. 12, 2006

(86) PCT No.: PCT/GB2006/000110

§ 371 (c)(1),
(2), (4) Date: Jul. 11, 2007

(87) PCT Pub. No.: WO2006/123084

PCT Pub. Date: Nov. 23, 2006

(65) Prior Publication Data

US 2008/0018526 A1  Jan. 24, 2008

(30) Foreign Application Priority Data

Jan. 19, 2005  (GB) ................. 0501043.4

(51) Int. Cl.
*G01S 13/58* (2006.01)

(52) U.S. Cl. ............... 342/107; 342/109; 342/118; 342/146

(58) Field of Classification Search ............... 342/107, 342/109, 118–146
See application file for complete search history.

(56) References Cited

U.S. PATENT DOCUMENTS

| 3,149,331 A * | 9/1964 | Kime | 342/137 |
|---|---|---|---|
| 3,344,426 A * | 9/1967 | Long | 342/157 |
| 4,136,341 A | 1/1979 | Mulder et al. | |
| 4,171,514 A * | 10/1979 | Faxon | 342/202 |
| 4,724,441 A * | 2/1988 | Fithian et al. | 342/368 |
| 4,983,979 A | 1/1991 | McKenzie | |
| 5,140,332 A * | 8/1992 | Martin et al. | 342/202 |
| 5,552,793 A * | 9/1996 | McLeod et al. | 342/204 |
| 5,940,346 A * | 8/1999 | Sadowsky et al. | 367/128 |
| 2003/0159943 A2* | 8/2003 | Walters et al. | 205/688 |
| 2004/0046689 A1* | 3/2004 | Rees et al. | 342/159 |
| 2004/0252047 A1* | 12/2004 | Miyake et al. | 342/107 |
| 2005/0135190 A1* | 6/2005 | Katou et al. | 367/99 |
| 2005/0179585 A1* | 8/2005 | Walker et al. | 342/134 |
| 2005/0179586 A1* | 8/2005 | Klinnert et al. | 342/137 |
| 2006/0109171 A1* | 5/2006 | Moch | 342/128 |
| 2006/0139020 A1* | 6/2006 | Wood et al. | 323/283 |

FOREIGN PATENT DOCUMENTS

| EP | 0 389 720 A | 10/1990 |
|---|---|---|
| GB | 2 085 251 A | 4/1982 |
| JP | 06-82550 A | 3/1994 |
| JP | 2002-139565 A | 5/2002 |
| WO | WO 03081278 A1 * | 10/2003 |

* cited by examiner

*Primary Examiner*—Thomas H Tarcza
*Assistant Examiner*—Timothy A Brainard
(74) *Attorney, Agent, or Firm*—Foley & Lardner LLP

(57) ABSTRACT

Marine radar apparatus propagates groups of three pulses A, B, C of the same amplitude but different widths, the shorter pulse enabling detection of close range targets and the longer pulses enabling detection of longer range targets. The pulses are encoded differently with the short pulse A being a continuous wave signal and the longer pulses being modulated with a frequency modulated chirp, one pulse C being chirp up and the other B being chirp down. The power of the radar need only be about 190 w.

23 Claims, 2 Drawing Sheets

RADAR APPARATUS

This invention relates to radar apparatus of the kind arranged to propagate groups of pulses of energy towards targets and to receive groups of pulses of energy reflected back by the targets.

Marine radar generally employs a high power magnetron as a microwave source for pulsed transmitted signals. In order to reduce the amount of clutter on the radar screen caused by return signals from waves, rain and the like, the apparatus has threshold circuits set to exclude lower amplitude signals. This arrangement works satisfactorily in the observation of larger vessels, land masses and the like but reduces the ability of the radar to display signals from smaller objects of interest, such as buoys, pleasure boats and fast attack craft.

Modern naval vessels are often designed to make them less easy to detect by hostile forces. The high power produced by conventional radar, however, can be relatively easy to detect by other vessels so is a disadvantage where a vessel needs to remain unobserved.

Although the amplitude of the transmitted radar energy can be reduced, this produces a corresponding reduction in the effective range of the apparatus so is not usually possible. The amplitude of the pulse could be reduced and its energy maintained by increasing the length of the pulse. The problem with longer pulses, however, is that it is not possible to detect close range targets because the return signal produced from close range targets will be received during the transmitted signal.

It is an object of the present invention to provide alternative radar apparatus.

According to one aspect of the present invention there is provided radar apparatus of the above-specified kind, characterised in that each group of energy pulses includes at least two pulses of different lengths, the shorter pulse enabling detection of close range targets and the longer pulse enabling detection of longer range targets, and that the different length pulses are encoded differently.

Preferably each group of pulses includes three pulses, each of the three pulses being of different width. The pulses may have widths of approximately 0.1 µs, 5 µs and 33 µs respectively. The pulses in each group preferably have the same amplitude. The radar apparatus is preferably arranged to subject the pulses to pulse compression on reception. The pulses are preferably encoded by frequency coding, such as a non-linear frequency modulation. Each group of pulses may include three pulses, the shortest being a continuous wave signal and the other two having a frequency modulated chirp, one being a chirp up and the other being a chirp down. The power output of the apparatus may be approximately 190 w.

According to another aspect of the present invention there is provided a method of detecting targets including the steps of transmitting a series of pulses of radar energy towards targets and receiving radar energy reflected by the targets, characterised in that the series of pulses includes at least two pulses of different widths, that the shorter pulse is suitable for use in detection of closer range targets that the longer pulse is suitable for use in detection of longer range targets, and that the two pulses are encoded differently from one another.

Marine radar apparatus and its method of operation according to the present invention, will now be described, by way of example, with reference to the accompanying drawing, in which.

Figure 1:
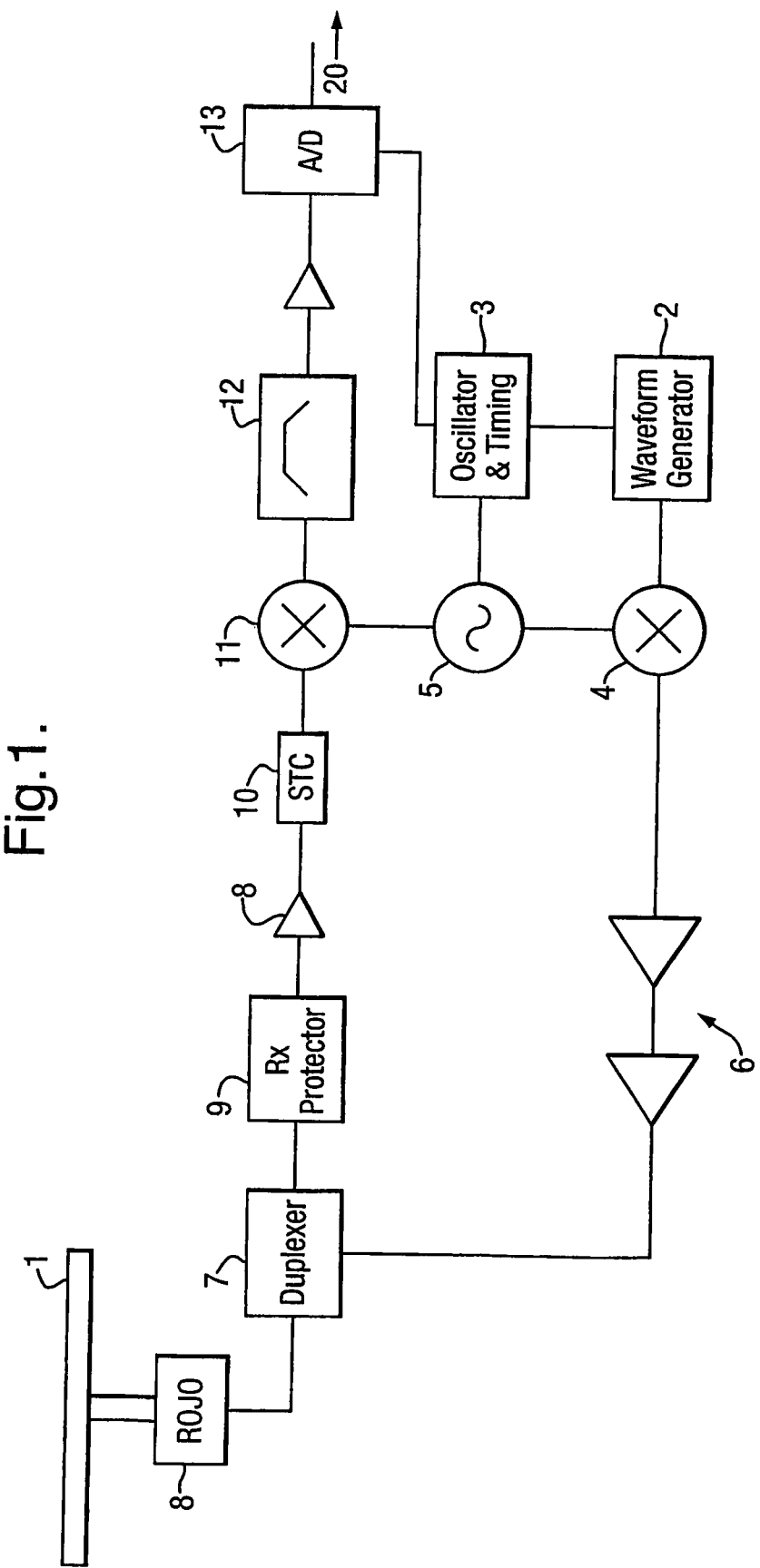
FIG. 1 is a schematic block diagram of the apparatus.
Figure 2:
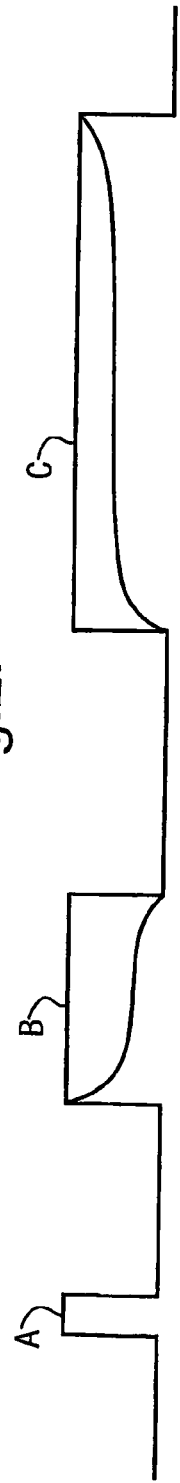
FIG. 2 illustrates the transmitted pulse pattern.

The apparatus includes a conventional radar antenna 1, such as a Kelvin Hughes LPA-A1. A waveform generator 2, such as employing a direct digital synthesis device, is controlled by a master oscillator and timing unit 3 to produce a frame or group of pulses that is the same regardless of the speed of rotation of the antenna 1 or the range setting of the apparatus. The frame or group of pulses repeats continuously and comprises three pulse repetition intervals A, B and C, as shown in FIG. 2, but not to scale. The pulses A, B and C have the same amplitude but have different widths or lengths. As an example only, pulse A might have a length of 0.1 µs, pulse B might have a length of 5 µs and pulse C might have a length of 33 µs. The spacing between the pulses A and B, and B and C depends on the range of the radar. When the waveform generator 2 receives a trigger from the oscillator and timing unit 3 it produces either a narrow pulse of a gated continuous wave signal or a pulse containing a frequency modulated chirp with a swept bandwidth of approximately 20 MHz. The shortest pulse A is a simple gated CW signal; the longer pulses B and C contain the frequency modulated chirp, one pulse having a chirp up and the other having a chirp down. In this way, the three different pulses A, B and C are encoded differently so that they can be distinguished from one another on reception, the shortest pulse being encoded by the absence of any chirp. The FM chirp applied to the two longer pulses is preferably of a non-linear kind. It can be seen, therefore, that each of the three pulses within one frame are unique both in length and coding.

The pulses produced by the waveform generator 2 are coherent pulsed bursts of low power and at an intermediate frequency of 60 MHz. These are supplied to a mixer 4 with signals from a second oscillator 5 to translate to a radio frequency between 2.9 and 3.1 GHz, such as, for example 3.05 GHz. The low power RF output of the mixer 4 is supplied to a multi-stage power amplifier 6 in order to produce an output of about 190 W. The output from the amplifier 6 is connected to a duplexer 7 and from there passes to the rotating joint 8 of the antenna 1 for transmission.

During the reception mode, the amplifier 6 is turned off to prevent leakage. Signals received by the antenna 1 pass via the duplexer 7 to a low noise receiver 8. At the front end of the receiver 8 a solid state receiver protector 9 protects the receiver from high energy signals which might enter during transmission or from external sources of radiation. The linear dynamic range of the overall receiver 8 is preferably 65 dB or greater. This dynamic range is increased by a sensitivity time control unit (STC) 10 immediately after the receiver 8 and implemented by a switched attenuator under control of the timing unit 3. The RF signals from the STC 10 pass to a second mixer 11 where they are frequency translated to an intermediate frequency of 60 MHz. The IF signals are supplied via a limiter and bandwidth filter 12 to an analogue-to-digital converter 13, which simultaneously digitises and translates the signals to an IF of 20 MHz. The output from the A/D converter 13 is supplied to a signal processor 20 as shown in FIG. 3.

Figure 3:
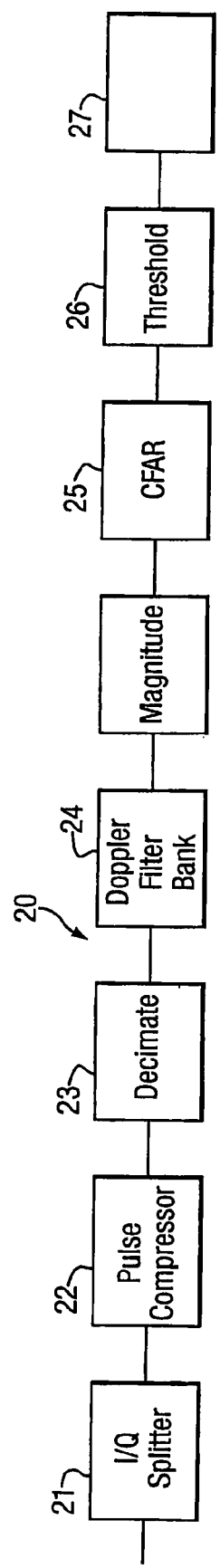
FIG. 3 is a block diagram of the signal processing carried out in the apparatus.

As will be appreciated, the blocks represented in FIG. 3 may represent either discrete units or steps in programming. The sampled signal from the A/D converter 13 is converted to baseband by an I/Q splitter block 21, which performs the function normally associated with analogue mixing and low pass filtering. As the signal is now at baseband, the sample rate is reduced within the block 21 by a factor of two to 40 MS/s. The unit 22 performs pulse compression on the samples received from the medium and long pulses B and C, and performs low pass filtering on the short pulses A. Pulse compression and low pass filtering are preferably performed in the frequency domain by taking a Fourier Transform of the samples received during the pulse repetition intervals, multiplying the transformed signal with a stored, pre-computed set of weights and then inverse Fourier transforming the product back into the time domain. The sample rate is then further reduced by a factor of two, to 20 MS/s, by a decimate block 23. From there the signal passes to a Doppler filter bank 24 comprising a bank of bandpass filters which span and divide the unambiguous target velocity into N channels, where N is the number of pulses coherently integrated. The Doppler filter bank 24 is created by transforming the signal samples collected from a range cell during a pulse burst into the frequency domain using a weighted Fourier transform. The output of each filter bank is then passed through a CFAR (constant false alarm rate) process 25 prior to passing to a threshold unit 26 where the signals are compared to a threshold and are identified as detected targets for supply to utilisation means such as a display screen, in the usual way. The Doppler information enables targets of different speeds to be identified and hence helps in distinguishing target information from clutter from the sea and rain, which will be identified as stationary. The coherent nature of the system further enables noise to be reduced.

The arrangement described above makes use of considerably lower power than has been possible previously because of the restricted range this normally causes. The power of a conventional marine radar is typically about 30 kW compared with that of the present invention, which can be around 190 W. The lower power used reduces the risk of detection of the vessel carrying the radar by hostile forces. The arrangement of the present invention enables reliable operation at low power and long range by providing energy pulses that are longer than previously used, such as up to about 22 µs compared with conventional radar employing relatively short pulses around 50 ns. In order to overcome the problem of longer pulses preventing detection at closer range, the present arrangement produces shorter duration pulses in addition to the longer pulses. Whilst a system employing just two different length pulses (one short and one long) would have some advantage, it has been found that it is better to use three different pulse lengths: short, medium and long, in order to provide reliable detection of medium range targets. The pulses do not necessarily have to be transmitted in order of increasing length. By encoding the pulses, it is possible to correlate the returned signals by their coding and thereby reduce the effects of interference; this also enables a reduction in the detection of echoes received from targets beyond the normal range.

It will be appreciated that the relative length of the pulses could be varied and that different forms of coding could be employed, such as noise coding or Barker codes.

The invention claimed is:

1. A marine radar apparatus, comprising a processor for generating Doppler information to enable targets of different speeds to be identified, wherein the apparatus is arranged to propagate continuously repeating groups of pulses of energy towards targets and to receive groups of pulses of energy reflected back by the targets,
    wherein each group of pulses includes three pulses A, B, and C of different widths in which there is a spacing between each of the pulses, the shorter pulse A enabling detection of close range targets and the longer pulses B and C enabling detection of longer range targets, and
    wherein the different length pulses are encoded differently from one another.

2. An apparatus according to claim 1, wherein the targets are marine targets.

3. An apparatus according to claim 2, wherein the marine targets are selected from the group consisting of buoys, pleasures boats, and fast attack craft.

4. An apparatus according to claim 1, wherein pulses A, B, and C have pulse widths of between 0.1 µs and 33 µs.

5. An apparatus according to claim 1, wherein the shorter pulse A has a width of approximately 0.1 µs.

6. An apparatus according to claim 1, wherein the longest pulse C has a width of approximately 33 µs.

7. An apparatus according to claim 1, wherein the processor comprises a Doppler filter bank.

8. An apparatus according to claim 7, wherein the Doppler filter bank comprises a bank of bandpass filters.

9. An apparatus according to claim 1, wherein the processor further comprises an I/Q splitter block, a pulse compressor, and a decimate block.

10. An apparatus according to claim 1, wherein the longer pulses B and C are frequency encoded.

11. An apparatus according to claim 1, wherein the longer pulses B and C are frequency coded by a non-linear frequency modulation.

12. An apparatus according to claim 1, wherein the shortest pulse A is a continuous wave signal and the other two pulses B and C have a frequency modulated chirp, one being a chirp up and the other being a chirp down.

13. An apparatus according to claim 1, wherein the apparatus is arranged to subject the longer pulses B and C to pulse compression on reception and to subject the shorter pulse A to low pass filtering.

14. An apparatus according to claim 1, wherein the pulses in each group A, B, and C have the same amplitude.

15. An apparatus according to claim 1, wherein the apparatus is adapted for use on a vessel, and wherein the apparatus has a low output power to reduce the risk of detection of the vessel carrying the apparatus.

16. An apparatus according to claim 1, wherein the output power is approximately 190 w.

17. A method of detecting marine targets comprising:
    (a) transmitting continuously repeating groups of pulses towards targets, wherein each group of pulses includes three pulses A, B, and C of different widths with a spacing between each of the pulses, the shorter pulse A enabling detection of close range targets and the longer pulses B and C enabling detection of longer range targets, wherein the different length pulses are encoded differently from one another;
    (b) receiving radar energy signals reflected by the targets; and
    (b) processing the received radar energy signals and generating Doppler information to enable targets of different speeds to be identified.

18. A method according to claim 17, wherein the marine targets are selected from the group consisting of buoys, pleasures boats, and fast attack craft.

19. A method according to claim 17, wherein the transmitting step comprises generating and transmitting a group of pulses having three pulses with pulse widths of between 0.1 µs and 33 µs.

20. A method according to claim 17, wherein the processing step comprises processing the received signals with a Doppler filter bank.

21. A method according to claim 17, wherein the longer pulses B and C are frequency encoded.

22. A method according to claim 17, wherein the longer pulses B and C are frequency coded by a non-linear frequency modulation.

23. A method according to claim 17, wherein the shortest pulse A is a continuous wave signal and the other two pulses B and C have a frequency modulated chirp, one being a chirp up and the other being a chirp down.

* * * * *